United States Patent [19]
Arnold

[11] 3,844,549
[45] Oct. 29, 1974

[54] MACHINE VISE
[76] Inventor: Franz Arnold, Spatzenweg 20, 8960 Kempton, Germany
[22] Filed: May 22, 1973
[21] Appl. No.: 362,782

[30] Foreign Application Priority Data
May 25, 1972 Germany............................ 2225474

[52] U.S. Cl.................. 269/247, 269/146, 269/248
[51] Int. Cl............................ B25b 1/10, B25b 1/24
[58] Field of Search.................... 269/146, 246–248, 269/321 ME

[56] References Cited
UNITED STATES PATENTS
2,139,292  12/1938  Tramsak ........................ 269/248 X
3,384,363   5/1968  Wermuth et al.................... 269/247
3,630,512  12/1971  Paret............................... 269/138

Primary Examiner—Roy Lake
Assistant Examiner—Neil Abrams
Attorney, Agent, or Firm—Woodhams, Blanchard and Flynn

[57] ABSTRACT

A vise, particularly a vise for use in a machine tool having means for directly supporting the movable jaw against tilting. The spindle nut of the vise is supported on and by at least two of a plurality of pins which may be retracted and subsequently replaced for rapid adjustment of the position of the spindle nut and when in place will support the spindle nut against both movement parallel with the axis of the vise spindle and also support the spindle nut against tilting motion in a plane through the axis of the vise spindle. This both minimizes the cost and improves the operation of the vise.

7 Claims, 6 Drawing Figures

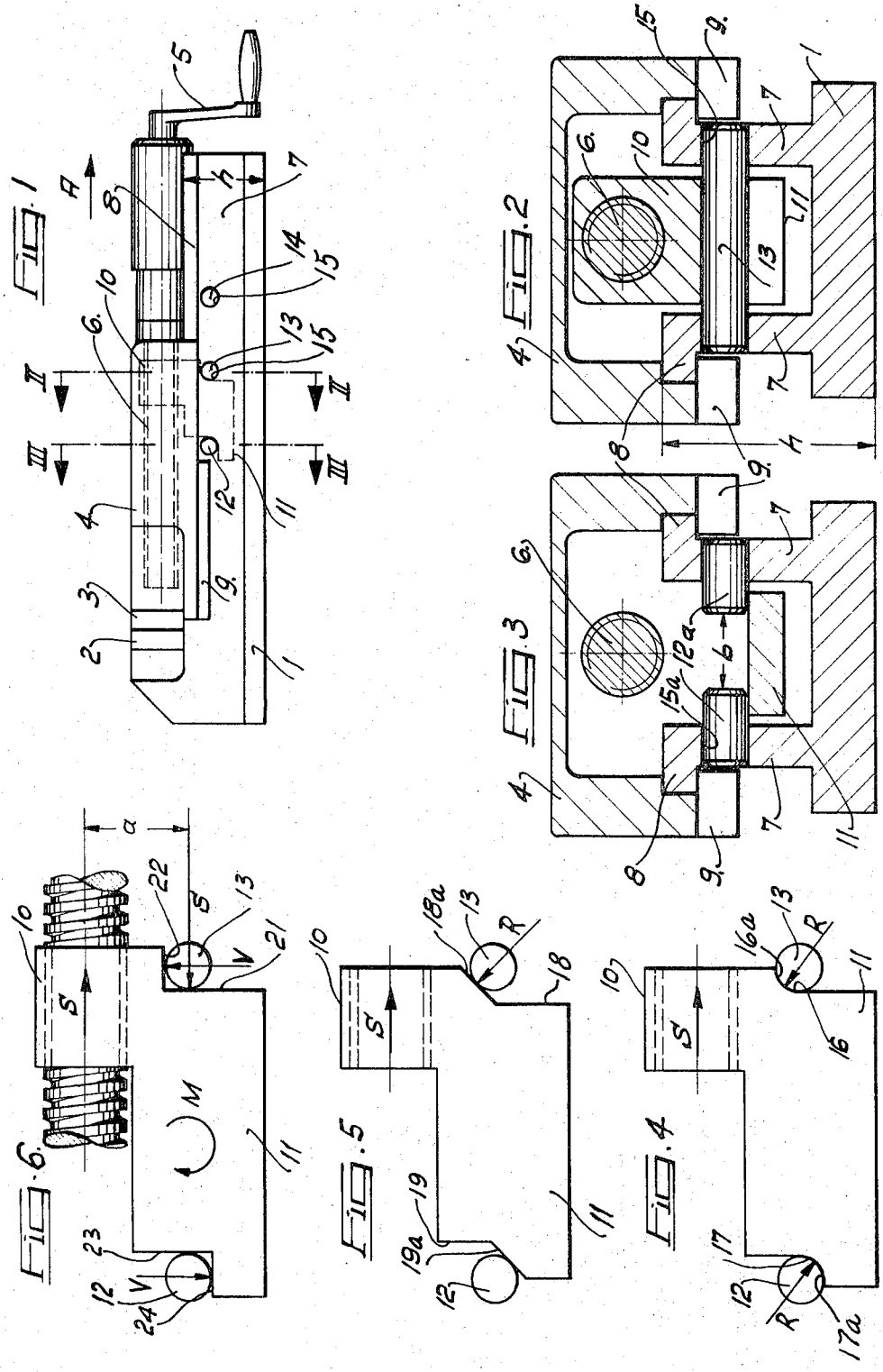

MACHINE VISE

The invention relates to a vise, particularly a machine vise, which has a baseplate with two outer guide plates, said baseplate having a U-profile and the guide plates serving to guide a jaw carrying slide. Further a row of cross holes is provided in the baseplate for inserting two support pins which hold the lower part of the spindle nut so that they absorb horizontal forces which are transmitted from the spindle nut longitudinally of the spindle axis.

In a known machine vise of this general type, there are provided at the leg ends of the U-profile and outwardly of the outer guide plates for the slide two further inner, horizontal guide plates at the upper and bottom side of which the spindle nut is guided, said spindle nut being provided with corresponding milled recesses. These inner guide plates with the associated guide surfaces of the spindle nut are required in order to absorb the tilting moment which acts onto the spindle nut because the support pins in this known construction absorb only the horizontal tension of the nut.

Further, in this known vise, a relatively low arrangement of the cross holes with the support pins is obtained so that in this manner the baseplate becomes relatively high.

The basic purpose of the present invention is to produce a vise of the type mentioned above which has an advantageous force distribution and which permits a simpler construction with a minimum of working (i.e., machined) surfaces and thus a considerably shorter manufacturing time. Further, it is desirable also to reduce the height of the baseplate.

This purpose is attained in a vise of the aforementioned construction according to the invention substantially by guiding the spindle nut only on the spindle and by constructing the surfaces of the spindle nut so that the vertical forces which are created by the tilting moment which acts onto the spindle nut are transmitted onto the support pins.

Thus in this new vise both the inner guide plates on the U-legs of the baseplate and also the corresponding guide surfaces on the spindle nut are not required. This considerably reduces the manufacturing time required because on the spindle nut only the surfaces which are supported on the support pins must be worked.

The invention will be discussed hereinafter in connection with the exemplary embodiment illustrated in the drawing, in which:

FIG. 1 is a side view of a vise;

FIGS. 2 and 3 are vertical cross-sectional views along the lines II—II and III—III, respectively;

FIG. 4 is an enlarged side view of the spindle nut together with the support pin of FIG. 1;

FIGS. 5 and 6 illustrate a modified construction of said spindle nut.

In the drawing the numeral 1 identifies the baseplate of a vise, which baseplate has a U-profile and carries a stationary jaw 2. The movable jaw 3 is secured on a slide 4 which can be moved longitudinally in a known manner by a spindle 6 operated by a handcrank 5. The legs 7 of the U-profile 1 have two outer guide plates 8 which serve to guide the slide 4. For this purpose guide rails 9 are provided on the slide, which guide rails grip under the guide plates 8.

A spindle nut 10 is provided into which the spindle 6 is threadedly received. This spindle nut has a lower part 11 by which the spindle nut can be supported on the support pins 12, 13, 14. A row of corresponding cross holes 15 for insertion of said pins is provided in the legs 7 of the baseplate. As can be seen in the drawing, two support pins hold the lower part 11 of the spindle nut. The spindle nut 10, 11 is thereby guided only with its thread on the spindle 6, and the boundary, or limiting, surfaces 16, 17 or 18, 19 (FIGS. 4, 5) or 20 to 23 (FIG. 6) of said spindle nut are constructed in such a manner that they not only transmit the horizontal tension forces S onto the support pins 12, 13 or 14 but in addition also the vertical forces V which are created by the tilting moment $M = S \times a$ which acts onto the spindle nut, wherein, as shown in FIG. 6, "$a$" illustrates the distance of the support pins from the spindle axis. Since the horizontal forces $S$ and vertical forces $V$ acting on the nut or support pins produce an inclined resultant force $R$, it is possible to absorb this resultant force $R$ by several possible constructions of the boundary surfaces of the nut, as illustrated in FIGS. 4 to 6. According to FIG. 4, the boundary surfaces 16, 17 each form approximately a quarter cylinder for support on the cylindrical support pins and including portions 16a, 17a, respectively. If desired, it is according to FIG. 5 also possible to provide boundary surfaces 18, 19 having sloped plane portions 18a, 19a, respectively or according to FIG. 6 boundary surfaces 20 to 23 having vertical portions 21, 23 and horizontal portions 22, 24.

In the illustrated and preferred embodiment, the cross holes 15 for the support pins 12 to 14 are arranged directly under the outer guide plates 8, whereby the rails 9 of the slide, which rails grip under these guide plates, extend when the jaws are closed as in FIG. 1 only to the first, or front most, cross hole, or to the first support pin 12. In this position the withdrawal of the support pins and therewith the rapid adjustment of the opening capacity of the vise is not hindered. This arrangement of the support pins directly below the guide plates 8 achieves a minimum distance "$a$" of the support pins from the spindle axis so that a minimum tilting moment $M = S \times a$ is also achieved and correspondingly smaller vertical forces V are thereby created. This high-positioned arrangement of the cross holes 15, which can be provided in any desired number, has further the advantage that if desired the height "$h$" of the baseplate can be reduced as compared with the known construction.

In the illustrated advantageous construction, in addition to the two support pins 13, 14 a split support pin 12 can be arranged in the first cross hole so that its short parts 12a (see FIG. 3) are supported only laterally on the spindle nut 10 (i.e. only near the sides of the spindle nut), so that between said parts 12a a greater distance "$b$" is provided which permits an easier removal of the chips from the baseplate. The parts 12a are pressed into the cross hole 15 or are fixedly arranged therein. For the rapid adjustment of the opening capacity, it is, as shown in the drawing, thus only necessary to pull out the pin 13, which may be provided with a corresponding small button, to pull back the slide 4 in the direction A, together with the nut 10, until the rightward boundary surface of said nut strikes against the support pin 14, and thereafter the pin 13 is again inserted into the same cross hole.

The device of the invention can be used for all spindle vises. However, it is particularly advantageous for machine vises because in those as a rule high tension forces occur which can be produced by hydraulic or mechanic power amplifiers which are built into the spindle 6.

I claim:

1. A vise, particularly a machine vise, of the kind having a movable clamping jaw and comprising in combination;

a base plate having a U-profile defining a pair of legs and having two outer guide plates on said legs;

a row of transverse cross holes in the said legs and support pins insertable in said holes;

a slide movably guided on said outer guide plates, which slide carries the clamping jaw;

a spindle which extends in the direction of slide movement and which is disposed above the support pins, the front end of said spindle being supported on the slide;

a spindle nut having a lower part which extends downwardly between said legs of said base plate, said spindle nut surrounding the spindle and being guided only on the spindle, said spindle nut lower part having a front limiting surface and a rear limiting surface for each abutting a respective one of said support pins, said rear limiting surface having a portion downwardly directed away from the spindle and upwardly supporting the spindle nut rear end on the abutting rear support pin, said front limiting surface having a portion directed upwardly toward the spindle and downwardly restraining the front end of the spindle nut on the abutting front support pin.

2. A vise according to claim 1, in which the support pin arranged in the frontmost cross hole is split to define an axially spaced pair of opposed short parts extending inboard from the base plate legs and abutting the spindle nut only adjacent the sides thereof.

3. A vise according to claim 1, in which the slide includes rails disposed in slideable gripping relation under said outer guide plates, the cross holes being located directly below said outer guide plates, said rails of said slide extending rearwardly only to the front most hole when the vise jaws are closed but being rearwardly movable past ones of said support pins without interference therefrom.

4. A vise according to claim 1, in which said rear and front limiting surfaces each include quarter cylinder shaped faces engageable with respective support pins and incorporating said downwardly and upwardly directed portions, respectively, as well as rearwardly and forwardly directed portions, respectively.

5. A vise according to claim 1, in which said downwardly and upwardly directed portions are planar, sloped and substantially oppositely facing surface portions bearing on respective adjacent support pins in sloped tangential relation.

6. A vise according to claim 1, in which said rear and front limiting surfaces are stepped to define planar, vertical, rearwardly and forwardly facing surface portions, respectively, and planar, horizontal faces which are said downwardly and upwardly directed portions, respectively, said portions of said limiting surfaces establishing a double line contact with the adjacent respective support pins.

7. A vise according to claim 1, in which said lower part of the spindle nut depends from said spindle between said legs, said spindle nut being free of contact with said legs, and hence with said slide supporting guide plates, the bearing contact between said spindle nut lower part and said support pins being spaced below said spindle, whereby a pull by said spindle on said spindle nut during tightening of said vise produces a rocking moment on said spindle nut, said downwardly and upwardly directed portions of said spindle nut positively bearing on said rear and front support pins to block rocking movement of said spindle nut in response to said moment.

* * * * *